(12) United States Patent
Gonzalez

(10) Patent No.: US 10,890,039 B2
(45) Date of Patent: Jan. 12, 2021

(54) DECK BUSHING SYSTEM FOR DRILLING MACHINES

(71) Applicant: Caterpillar Global Mining Equipment LLC, Denison, TX (US)

(72) Inventor: Fernando Gonzalez, Sherman, TX (US)

(73) Assignee: Caterpillar Global Mining Equipment LLC, Denison, TX (US)

( * ) Notice: Subject to any disclaimer, the term of this patent is extended or adjusted under 35 U.S.C. 154(b) by 195 days.

(21) Appl. No.: 16/158,758

(22) Filed: Oct. 12, 2018

(65) Prior Publication Data
US 2020/0115973 A1    Apr. 16, 2020

(51) Int. Cl.
*E21B 19/24* (2006.01)
*E21B 17/10* (2006.01)
*F16C 23/02* (2006.01)

(52) U.S. Cl.
CPC .......... *E21B 19/24* (2013.01); *E21B 17/1007* (2013.01); *F16C 23/02* (2013.01); *E21B 17/1085* (2013.01)

(58) Field of Classification Search
CPC .. E21B 19/24; E21B 17/1007; E21B 17/1085; F16C 23/02
See application file for complete search history.

(56) References Cited

U.S. PATENT DOCUMENTS

| | | |
|---|---|---|
| 3,944,300 A | 3/1976 | Learmont et al. |
| 2015/0315859 A1 | 11/2015 | Strydom |
| 2017/0234087 A1* | 8/2017 | Gaska ..................... E21B 19/18 175/85 |

* cited by examiner

*Primary Examiner* — Brad Harcourt
(74) *Attorney, Agent, or Firm* — Bookoff McAndrews

(57) ABSTRACT

A deck bushing system for a drilling machine having a mast deck including a deck hole is disclosed. The deck bushing system may include a deck bushing sized to be received in the deck hole. The deck bushing may include a tubular member having a generally square shaped flange. Additionally, the deck bushing system may include a deck bushing housing fixedly secured to the mast deck. The deck bushing housing may form a generally V-shape opening toward the deck hole.

18 Claims, 4 Drawing Sheets

DECK BUSHING SYSTEM FOR DRILLING MACHINES

TECHNICAL FIELD

The present disclosure relates generally to drilling machines, and more particularly, to a deck bushing system for such drilling machines.

BACKGROUND

Mobile blasthole drilling machines, are typically used for drilling blastholes for mining, quarrying, dam construction, and road construction, among other uses. The process of excavating rock, or other material, by blasthole drilling comprises using the blasthole drill machine to drill a plurality of holes into the rock and filling the holes with explosives. The explosives are detonated causing the rock to collapse, and rubble of the collapse is then removed and the new surface that is formed is reinforced. Many current blasthole drilling machines utilize rotary drill rigs, mounted on a mast, that can drill blastholes anywhere from 6 inches to 22 inches in diameter and depths up to 180 feet or more.

The mast of blasthole drilling machines typically includes a bottom deck. The bottom deck includes a deck hole for the drill string, and a removable deck bushing is secured about the hole for radially supporting the drilling pipe string and for preventing undesired wear to the deck. Current deck bushings may include an anti-rotation feature that prevents rotation of an outer tubular member of the deck bushing by the drill string. When lowering a drill string and a connected deck bushing toward the deck hole, such an anti-rotation feature of the deck bushing may require difficult alignment of a reaction surface with the deck. Therefore, the operator might try several times before successfully engaging the reaction surface. Another problem of current deck bushings may result from the shape of the reaction surface, as it may be prone to blockage by dirt from the drilling operation.

U.S. Pat. No. 3,944,300, issued to Learmont et al. ("the '300 patent"), describes a deck bushing of a blasthole drill resiliently mounted to dampen lateral vibrations of the drill string. The deck bushing of the '300 patent is a conventional tubular deck bushing with circular flange. The '300 patent discloses that the flange of the deck bushing includes diametrically opposite cutouts that receive lugs that are welded to a top plate of a bushing housing to prevent rotation. Thus, the '300 patent requires alignment of the cutouts and lugs during assembly. One or more features of the present disclosure may solve one or more of the problems set forth above and/or other problems in the art. The scope of the current disclosure, however, is defined by the attached claims, and not by the ability to solve any specific problem.

SUMMARY

In one aspect, a deck bushing system for a drilling machine having a mast deck including a deck hole is disclosed. The deck bushing system may comprise: a deck bushing sized to be received in the deck hole, the deck bushing including a tubular member having a generally square shaped flange; and a deck bushing housing fixedly secured to the mast deck, the deck bushing housing forming a generally V-shape opening toward the deck hole.

In another aspect, a deck bushing system for a mobile blasthole drilling machine having a mast deck including a deck hole is disclosed. The deck bushing system may comprise: a deck bushing sized to be received in the deck hole, the deck bushing including a tubular member having a flange including an outer edge surface having a plurality of linear portions equally spaced about a periphery of the tubular member; and a deck bushing housing fixedly secured to the mast deck, the deck bushing housing being located on only one side of the deck hole and including walls to restrict movement of the deck bushing when the deck bushing is located in the deck hole.

In yet another aspect, a deck bushing for a mobile blasthole drilling machine is disclosed. The deck bushing may comprise: an outer tubular member having a generally square shaped flange, the generally square shaped flange including four sides, with each side having an outer edge surface including a plurality of linear portions, each separated by a cutout; and an inner tubular member received in the outer tubular member and rotatable relative to the outer tubular member.

BRIEF DESCRIPTION OF THE DRAWINGS

The accompanying drawings, which are incorporated in and constitute a part of this specification, illustrate various exemplary embodiments and together with the description, serve to explain the principles of the disclosure.

DETAILED DESCRIPTION

Both the foregoing general description and the following detailed description are exemplary and explanatory only and are not restrictive of the claimed features. As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus. Further, unless stated otherwise, relative terms, such as, for example, "about," "substantially," "generally," and "approximately" are used to indicate a possible variation of ±10% in a stated value.

Figure 1:
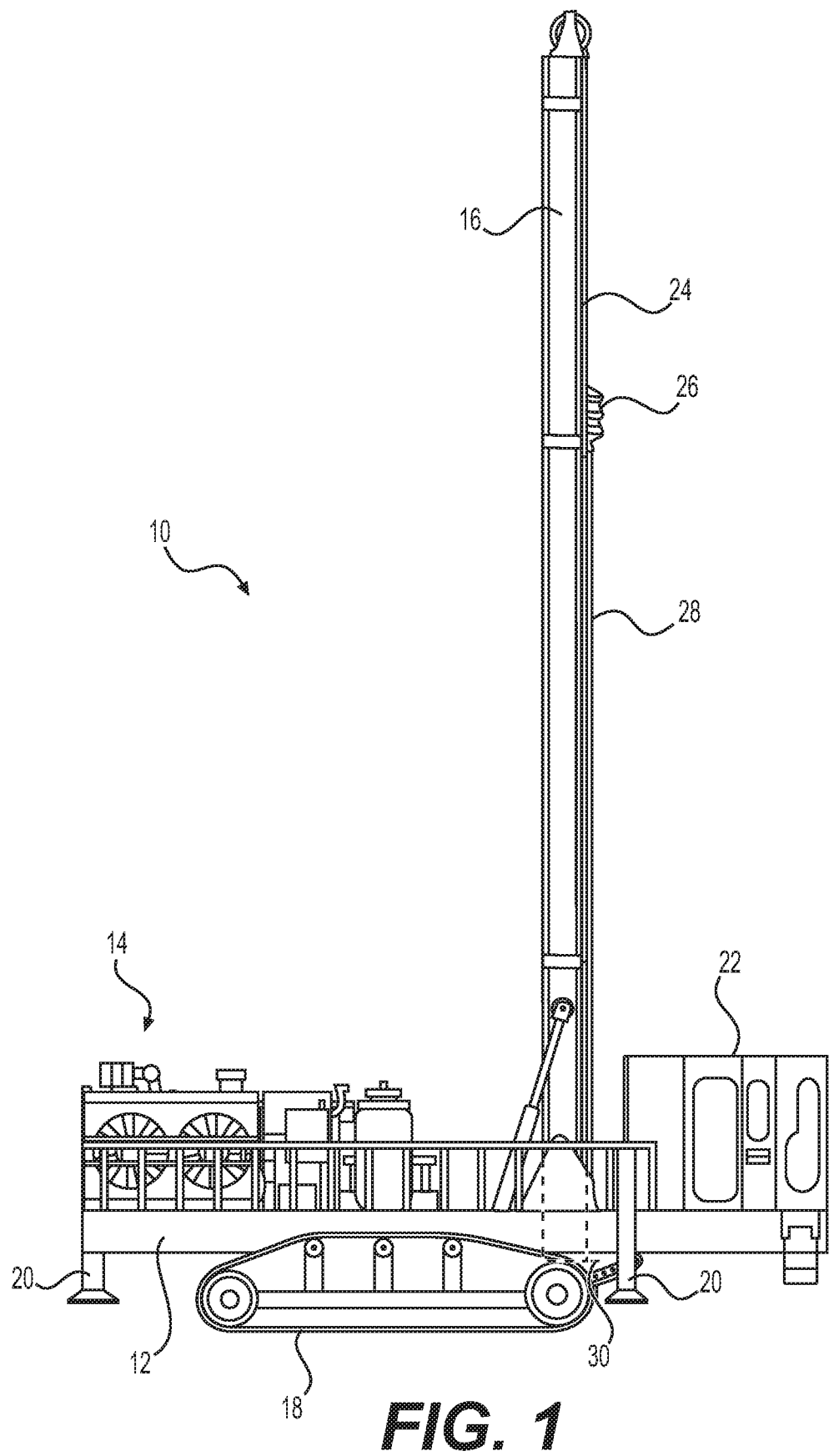
FIG. 1 illustrates a schematic side view of a mobile drilling machine according to aspects of the disclosure.

FIG. 1 illustrates a schematic side view of an exemplary drilling machine 10. The disclosure herein may be applicable to any type of drilling machine, however, reference will be made below particularly to a mobile blasthole drilling machine. As shown in FIG. 1, mobile blasthole drilling machine 10 may include a frame 12, machinery 14, and a drilling mast 16. Frame 12 may be supported on a ground surface by a transport mechanism, such as crawler tracks 18. Crawler tracks 18 may allow mobile drilling machine 10 to maneuver about the ground surface to a desired location for a drilling operation. Frame 12 may further include one or more jacks 20 for supporting and leveling mobile drilling machine 10 on the ground surface during the drilling operation. Frame 12 may support the machinery 14, which may include motors, engines, batteries, compressors, pumps, hydraulic systems, and any other equipment necessary to power and operate mobile drilling machine 10. Frame 12 may further support an operator cab 22, from which an operator may maneuver and control mobile drilling machine 10.

As further shown in FIG. 1, drilling mast 16 may include a mast frame 24 which may support a movable drill motor assembly or rotary head 26. The rotary head 26 may support a drill string 28 on which a drill bit (not shown) is mounted for drilling into the ground surface. The mast frame 24 of drilling mast 16 may further include a mast deck 30 located at a bottom end of the drilling mast 16. Drilling mast 16 may be any suitable mast capable of supporting a rotary head 26 and drill string 28. The drilling mast 16 may be pivoted to allow drilling mast 16 to be raised and lowered to a desired drilling angle position for the drilling operation.

Figure 2A:
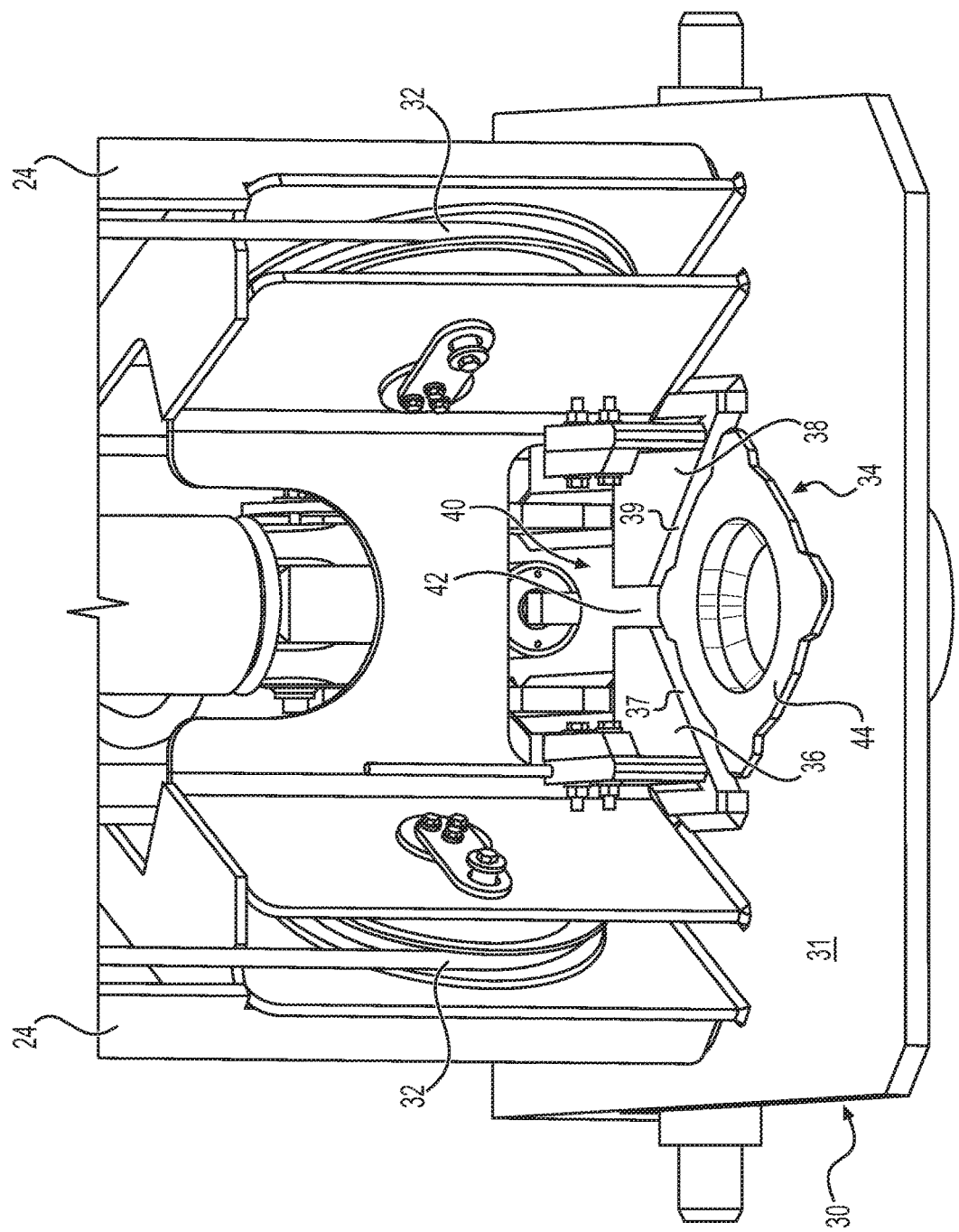
FIG. 2A illustrates a perspective view of a mast deck of the mobile drilling machine of FIG. 1, with the drill string omitted for clarity.
Figure 2B:
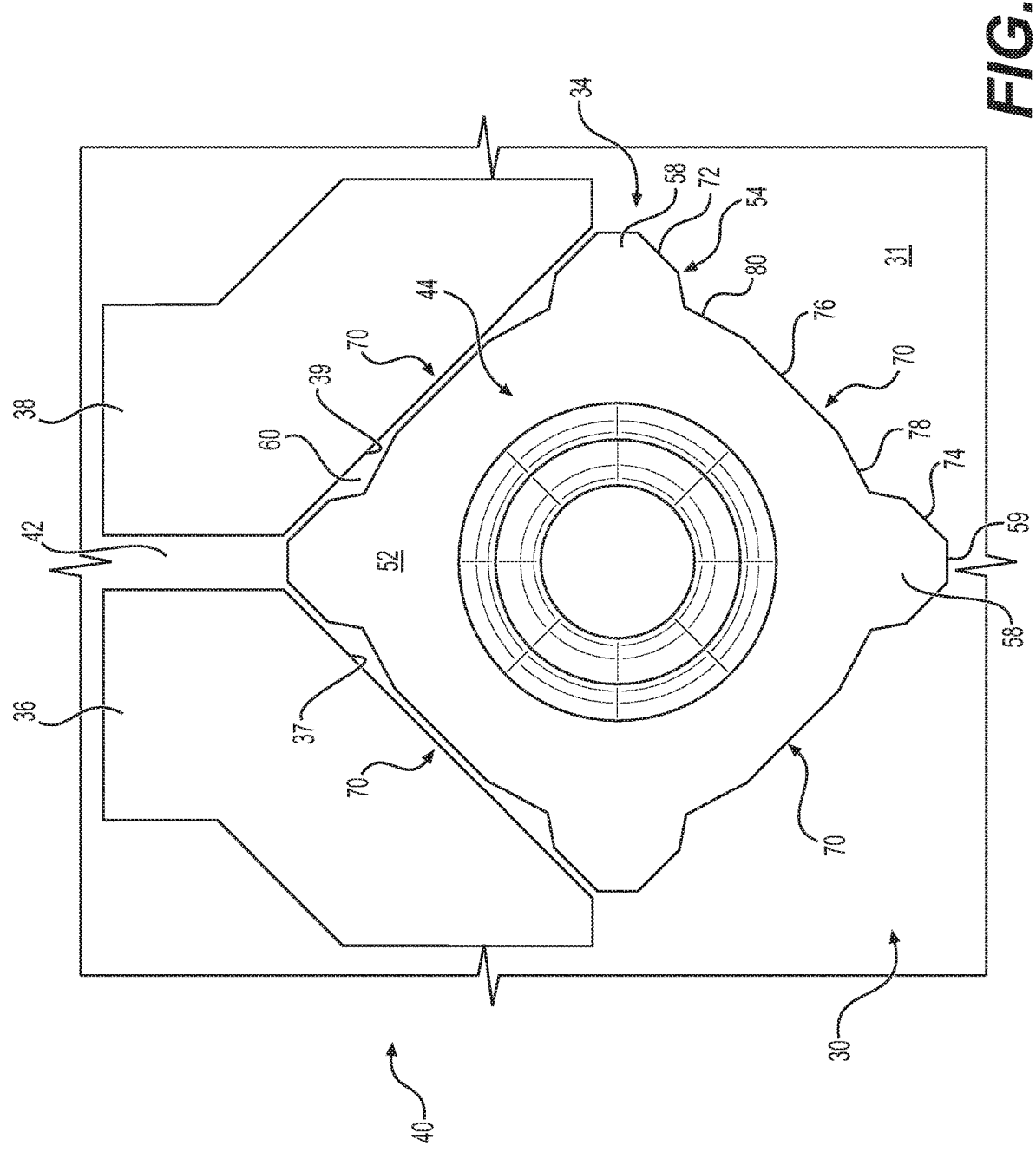
FIG. 2B illustrates a top view of a portion of the mast deck of FIGS. 1 and 2A.

FIGS. 2A and 2B illustrate a perspective view and a partial top view, respectively, of the mast deck 30 of the mobile drilling machine 10, with a deck bushing 34 mounted on the mast deck 30. While is it understood that the deck bushing 34 is received on drill string 28, the drill string 28 has been omitted in FIGS. 2A and 2B for clarity. As shown in FIG. 2A, mast deck 30 may be located at a bottom end of the drilling mast 16 and may provide a base for the drilling mast 16. Mast deck 30 may include a base plate 31 made of any suitable material, such as a steel plate or the like. Mast deck 30 may support the mast frame 24 and portions of a pulley system 32 for raising and lowering the rotary head 26. Base plate 31 of mast deck 30 may further include a deck hole for receiving the drill string 28 and the deck bushing 34.

Base plate 31 may include a deck bushing housing 40 for receiving and securing the deck bushing 34. Deck bushing housing may include a first stop plate 36 and a second stop plate 38 may be mounted on base plate 31 to provide walls or reaction surfaces 37, 39 for deck bushing 34. First stop plate 36 and second stop plate 38 may be fixedly coupled to base plate 31 by any conventional mounting means, such as by welding, integral forming, or the like. The first stop plate 36 and the second stop plate 38 may protrude from a top surface of the base plate 31 to provide the reaction surfaces 37, 39 for the deck bushing 34 when the deck bushing 34 is inserted in the deck hole of the base plate 31. As shown, first and second stop plates 36, 38 are located on only one side of the deck hole. The first stop plate 36 and the second stop plate 38 may be spaced apart from each other by a gap 42. In an exemplary embodiment, the reaction surfaces 37, 39 of the first stop plate 36 and the second stop plate 38 may be planar and extend generally normal to the top surface of base plate 31, and may be angled generally normal to one another to form a generally V-shape opening toward the deck hole. The gap 42 may be located at the center of the V-shape. While the exemplary embodiment includes a first stop plate 36 and a second stop plate 38, any number of stop plates may be used for providing similarly configured reaction surfaces 37, 39 for deck bushing 34.

Figure 3:
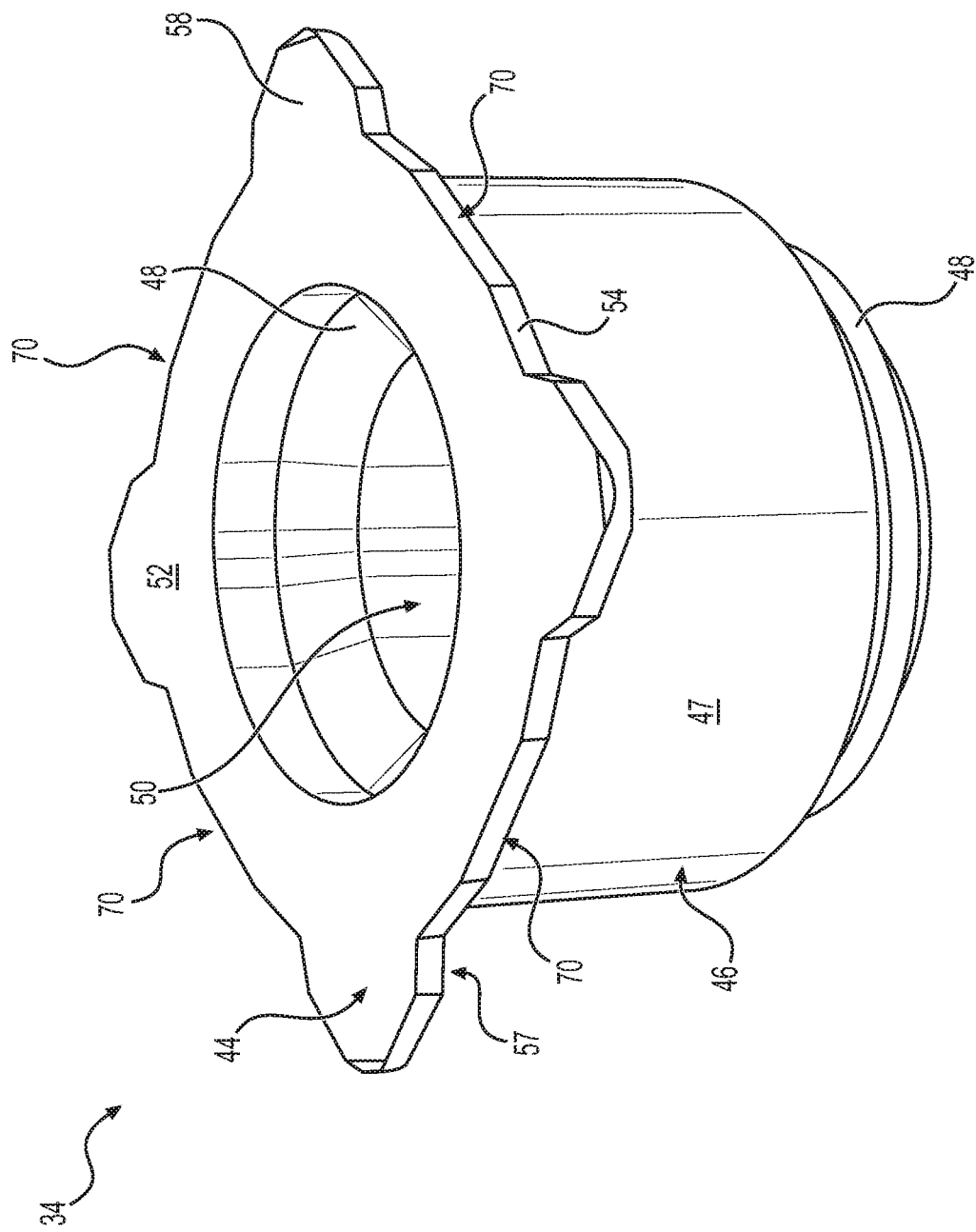
FIG. 3 illustrates a perspective view of the deck bushing isolated from the mast deck of FIGS. 2A and 2B, according to aspects of the disclosure.

FIG. 3 illustrates a perspective view of the deck bushing 34 isolated from the mast deck 30. As shown, deck bushing 34 may include an outer tubular member 46 and an inner tubular member 48. The outer tubular member 46 may have a generally tubular section 47 and a generally square shaped flange 44 at a top end thereof. The inner tubular member 48 may be concentrically disposed within the outer tubular member 46, and the inner tubular member 48 may be vertically supported by outer tubular member 46, such as by mating radially extending flanges (not shown) of the inner and outer tubular members 48, 46. Further, inner tubular member 48 may be rotatable with respect to the outer tubular member 46 of the deck bushing 34 about a vertical axis defined by the drill string 28. In one embodiment, the deck bushing 34 may include a number of internal rolling balls (not shown) disposed between the outer tubular member 46 and the inner tubular member 48 to facilitate rotation between the members 48, 46. In another embodiment, the outer tubular member 46 and the inner tubular member 48 may be in direct sliding contact with one another. As referenced above, the inner tubular member 48 receives the drill string 28 (via bore 50) such that the inner tubular member 48 may rotate based on the rotation of the drill string 28.

With reference to FIG. 2B and FIG. 3, the flange 44 of outer tubular member 46 may include a top surface 52, an outer edge surface 54, and an under surface 57. Under surface 57 is configured to rest on base plate 31 of mast deck 30 when the deck bushing 34 is located in the deck hole. The flange 44 may include a shape to be received within and mate with the reaction surfaces 37, 39 of the first stop plate 36 and second stop plate 38 of the deck bushing housing 40. For example, as noted above, the flange 44 may be generally square shaped, such that a corner 58 of the generally square shaped flange 44 may fit centrally between the first stop plate 36 and the second stop plate 38 so that the corner 58 is aligned within gap 42. As used herein, a "generally square shaped flange" includes flanges that have outer edges having at least four linear portions, with adjacent linear portions arranged normal to one another.

Referring to FIG. 2B, the outer edge surface 54 of flange 44 may define four identical sides 70. Each side 70 may include one or more separated linear portions, such as one linear portion 72 extending from one corner 58, one linear portion 74 extending from an opposite corner 58, and one linear portion 76 located at a central portion of a side 70. The linear portions 72, 74, 76 of outer edge surface 54 may form a flat or planar surface extending normal to the top and under surfaces 52, 57 of flange 44. Each side may further include one or more cutouts. For example, the central linear portion 76 may be separated from the end linear portions 72, 74 by cutouts 78, 80. Cutouts 78, 80 may be generally V-shaped as shown, or be formed of alternative shapes. Further, the corners 58 of the generally square shaped flange 44 may include a flattened or rounded tips 59. The flattened tip 59 of the corner 58 may help ease placement of the generally square shaped flange within deck bushing housing 40.

With reference to FIG. 2B, in the exemplary embodiment, the four corners 58 correspond to four placement positions of the deck bushing 34 in the deck bushing housing 40. When deck bushing 34 is positioned in the deck hole of mast deck 30, edge surface 54 of flange 44 forms a clearance or gap 60 with the reaction surfaces 37, 39 of deck bushing housing 40. Cutouts 78, 80 of flange 44 provide of areas of increased clearance or gap 60. Linear portions 72, 74, 76 provide mating areas of contact between the flange 44 and the reaction surfaces 37, 39 of the deck bushing housing 40. Accordingly, deck bushing 40 prevents the outer tubular member 46 of deck bushing 34 from rotating. Therefore, inner tubular member 48 of deck bushing 34 may rotate within outer tubular member 46, while outer tubular member 46 may be prevented from rotating.

INDUSTRIAL APPLICATION

The deck bushing 34 of the present disclosure may be used in any type of drilling machine 10, such as a mobile blasthole drill machine, that utilizes a deck bushing with the drill string 28. Referring to FIGS. 2A and 2B, the present disclosure relates to a deck bushing 34 having a generally square shaped flange 44 to facilitate placement in the mast deck 30. Due to repeated drilling operations, the drill bit (not shown) may be subjected to wear, and therefore, may require either replacement or sharpening of the drill bit. During replacement or maintenance of the drill bit, the operator may hoist the drill bit, and with it the deck bushing 34, so that the drill bit and deck bushing 34 are above the mast deck 30. After replacement or maintenance of the drill bit, the operator may lower the drill bit and align the generally square shaped flange 44 of the deck bushing 34 with the first stop plate 36 and the second stop plate 38 of the deck bushing housing 40. The generally square shaped flange 44 of the present disclosure may allow the deck bushing 34 to have four placement positions in which the flange 44 may be placed in the deck bushing housing 40. Thus, the operator may only need to rotate the drill string 28 less than a quarter rotation to align the deck bushing 34 with the deck bushing housing 40. Therefore, the generally square shaped flange 44 of deck bushing 34 may facilitate efficient placement of the deck bushing 34 within deck bushing housing 40.

The clearance or gap 60 (FIG. 2B) between deck bushing 34 and the deck bushing housing 40 of the present disclosure may also facilitate placement of the deck bushing 34 in the deck hole of the mast deck 30. During the drilling operation, debris, such as dirt, dust, mud, oil and/or grease may build up on the mast deck 30, including in the deck bushing seating area adjacent the deck bushing housing 40. The clearance or gap 60 between the deck bushing 34 and deck bushing housing 40 may allow for migration of debris between the surfaces without preventing proper seating of the deck bushing 34 on the mast deck 30. Further, cutouts 78, 80 on the flange 44 of the deck bushing 34 may allow for additional migration of debris during placement of the deck bushing on the mast deck 30, thereby facilitating appropriate mating of contact areas between the linear portions 72, 74, 76 of the flange 44 and the reaction surfaces 37, 39 of deck bushing housing 40. Finally, the open V-shape formed by the first and second stop plates 36, 38, and the gap 42 between the stop plates 36, 38, facilitate cleaning of the deck bushing seating area of the mast deck 30, such as by blowing compressed air or pressurized liquid at the deck bushing housing to funnel debris out through the gap 42.

It will be apparent to those skilled in the art that various modifications and variations can be made to the disclosed system without departing from the scope of the disclosure. For example, while deck bushing 34 is described above as having an rotating inner tubular member 48, it is understood that the inner tubular member 48 could be omitted so that the deck bushing includes only the outer tubular component 46. Further, it is understood that a generally triangular shape flange could also be used to mate with the deck bushing housing 40. In such a configuration, flange 44 may include an outer edge having a plurality, e.g. at least three, linear portions equally spaced about a periphery of the outer tubular member 46. Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A deck bushing system for a drilling machine having a mast deck including a deck hole, comprising:
   a deck bushing sized to be received in the deck hole, the deck bushing including a tubular member having a generally square shaped flange; and
   a deck bushing housing fixedly secured to the mast deck, the deck bushing housing forming a generally V-shape opening toward the deck hole,
      wherein the tubular member is an outer tubular member, and the deck bushing further includes an inner tubular member rotatable relative to the outer tubular member.

2. The deck bushing system of claim 1, wherein the deck bushing housing includes planar reaction surfaces that form the generally V-shape to be contacted by an outer edge surface of the generally square shaped flange to restrict rotation of the tubular member.

3. The deck bushing system of claim 1, wherein the deck bushing housing includes:
   a first stop plate; and
   a second stop plate spaced apart from the first stop plate, wherein the first stop plate and the second stop plate form the generally V-shape for receiving the generally square shaped flange to restrict rotation of the tubular member.

4. The deck bushing system of claim 3, wherein a gap is included between the first stop plate and the second stop plate, the gap sized to receive a corner of the generally square shaped flange.

5. The deck bushing system of claim 1, wherein the generally square shaped flange includes four sides, each side including a outer edge surface having one or more cutouts.

6. The deck bushing system of claim 5, wherein each side further includes a plurality of separated linear portions.

7. The deck bushing system of claim 6, wherein each side includes a plurality of cutouts, each cutout separating two of the plurality of linear portions.

8. The deck bushing system of claim 7, wherein the linear portions are configured to mate with reaction surfaces of the deck bushing housing.

9. The deck bushing system of claim 1, wherein the drilling machine is a mobile blasthole drilling machine.

10. A deck bushing system for a mobile blasthole drilling machine having a mast deck including a deck hole, comprising:
    a deck bushing sized to be received in the deck hole, the deck bushing including a tubular member having a flange including an outer edge surface having a plurality of linear portions equally spaced about a periphery of the tubular member; and
    a deck bushing housing fixedly secured to the mast deck, the deck bushing housing being located on only one side of the deck hole and including walls to restrict movement of the deck bushing when the deck bushing is located in the deck hole,
       wherein the deck bushing and deck bushing housing form a gap therebetween, and the flange includes cutouts that vary the gap.

11. The deck bushing system of claim 10, wherein the walls of the deck bushing housing include planar reaction surfaces to mate with two of the linear portions of the deck bushing flange.

12. The deck bushing system of claim 11, wherein the planar reaction surfaces include two reaction surfaces orientated normal to each other.

13. The deck bushing system of claim 10, wherein the deck bushing housing includes:
    a first stop plate; and
    a second stop plate spaced apart from the first stop plate such that a gap is formed between the first stop plate and the second stop plate.

14. The deck bushing system of claim 10, wherein the flange is generally square shaped.

15. A deck bushing for a mobile blasthole drilling machine, comprising:
- an outer tubular member having a generally square shaped flange, the generally square shaped flange including four sides, with each side having an outer edge surface including a plurality of linear portions, each separated by a cutout; and
- an inner tubular member received in the outer tubular member and rotatable relative to the outer tubular member.

16. The deck bushing of claim 15, wherein the cutouts are generally V-shaped.

17. The deck bushing of claim 16, wherein the generally square shaped flange includes four corners having flattened or rounded tips.

18. The deck bushing of claim 17, wherein the plurality of linear portions includes three linear portions, one at each end of the side, and one centrally located on the side.

* * * * *